Feb. 3, 1970  F. T. SPELLMAN, JR  3,493,136
VEHICLE MOUNTED CONVEYOR

Filed June 26, 1967  4 Sheets-Sheet 1

INVENTOR
FRANCIS T. SPELLMAN, JR.
BY
Andrus & Starke
Attorneys

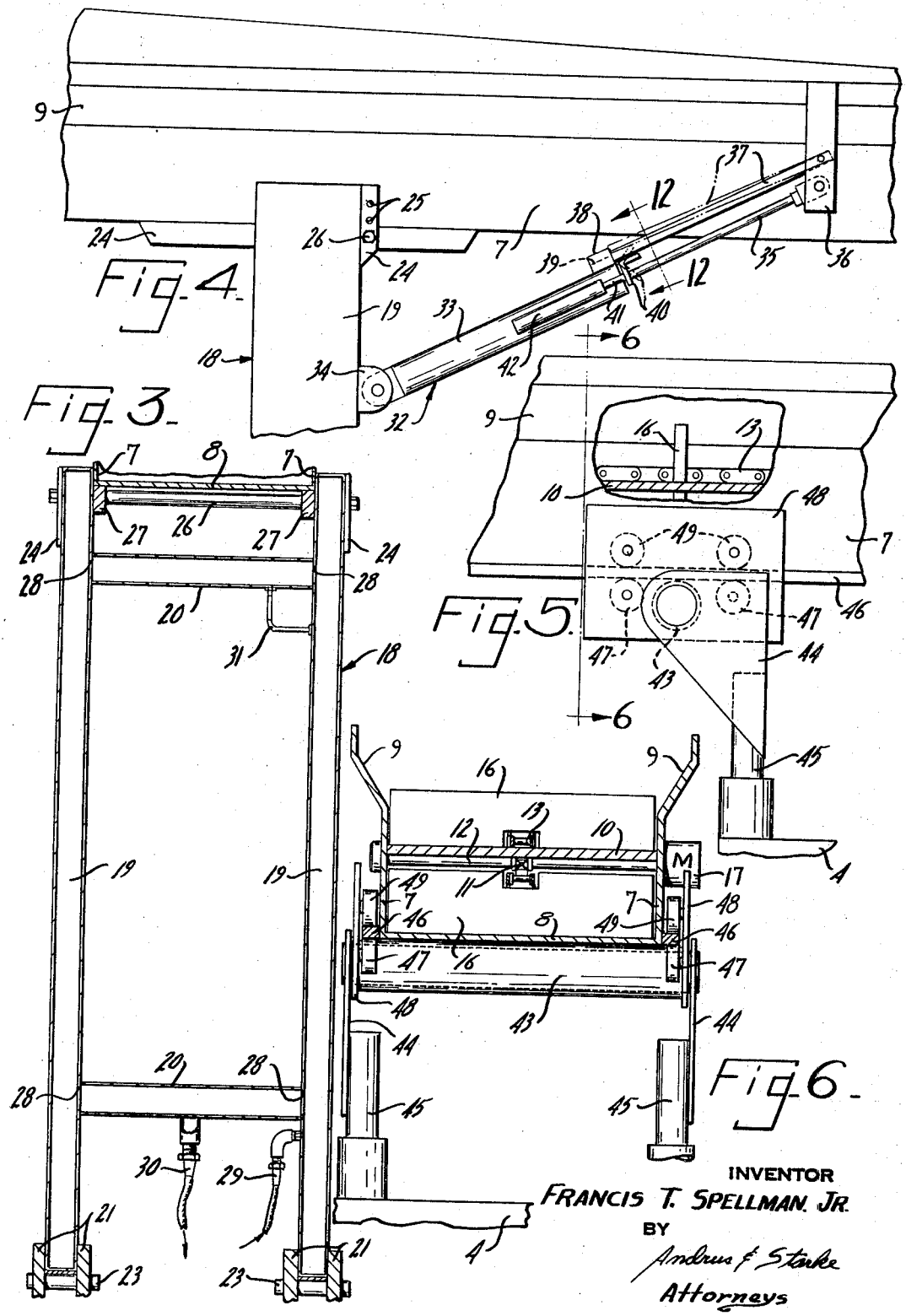

Feb. 3, 1970    F. T. SPELLMAN, JR    3,493,136
VEHICLE MOUNTED CONVEYOR
Filed June 26, 1967    4 Sheets-Sheet 3
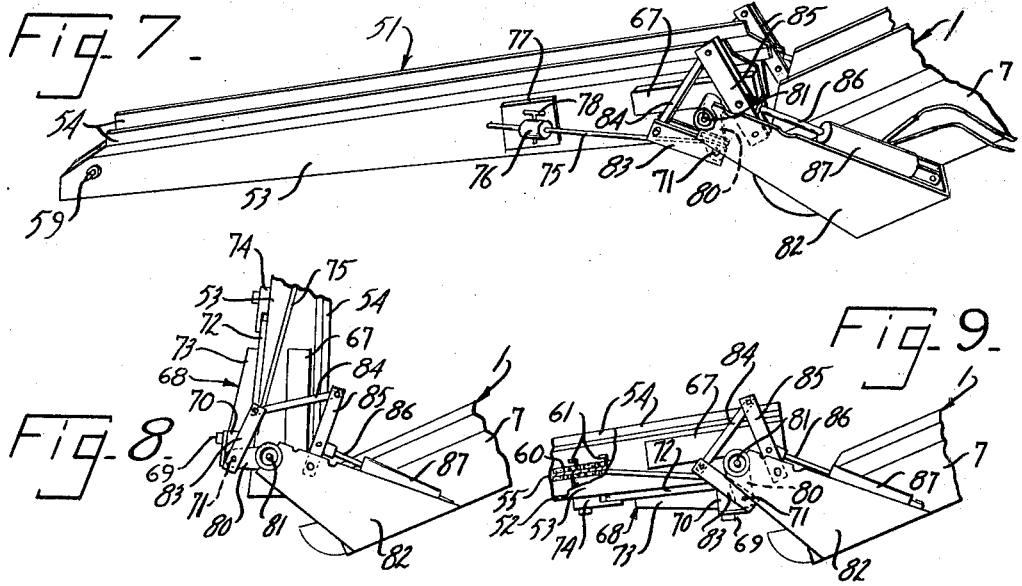
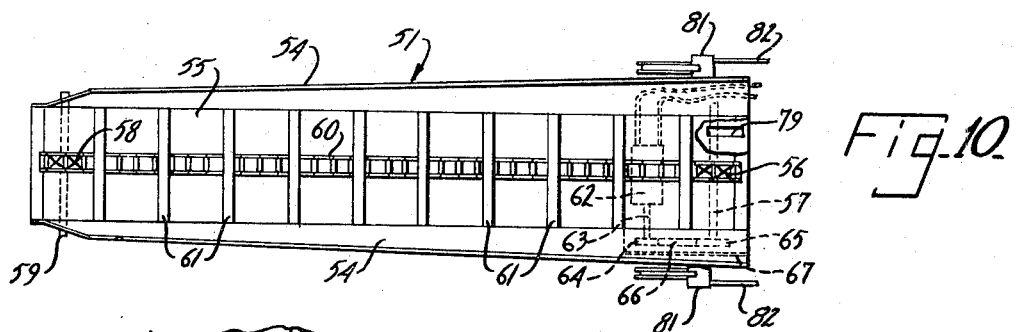
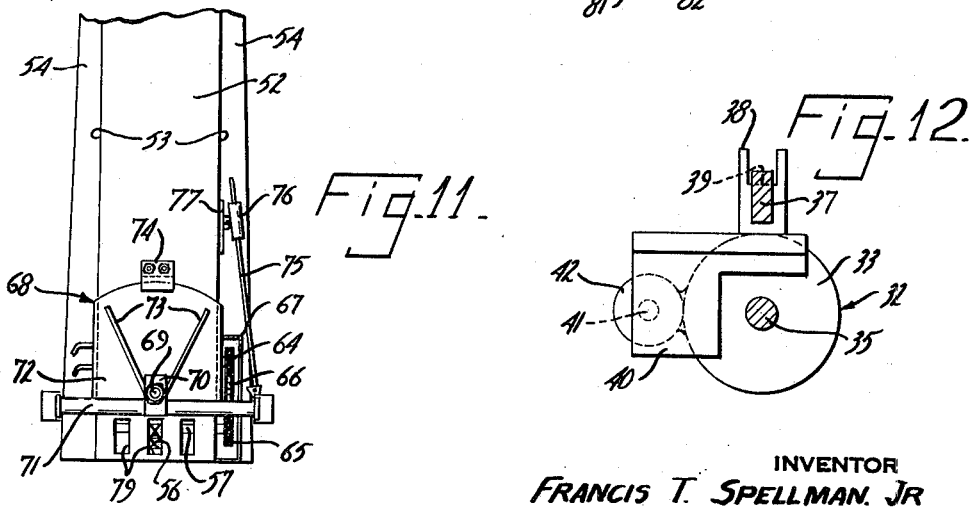
INVENTOR
FRANCIS T. SPELLMAN. JR
BY
Andrus & Starke
Attorneys Feb. 3, 1970  F. T. SPELLMAN, JR  3,493,136
VEHICLE MOUNTED CONVEYOR Filed June 26, 1967  4 Sheets-Sheet 4

INVENTOR
FRANCIS T. SPELLMAN, JR.
BY
Andrus & Starke
Attorneys

United States Patent Office 3,493,136
Patented Feb. 3, 1970

3,493,136
VEHICLE MOUNTED CONVEYOR
Francis T. Spellman, Jr., Verona, Wis., assignor to Spellman Hydraveyor, Inc., Madison, Wis., a corporation of Wisconsin
Filed June 26, 1967, Ser. No. 648,731
Int. Cl. B60p 1/04, 1/00; B65g 37/00
U.S. Cl. 214—509                                     16 Claims

ABSTRACT OF THE DISCLOSURE

This invention relates to a vehicle-mounted conveyor unit. The conveyor unit includes a main conveyor which is movable from a generally horizontal transporting position above the vehicle or truck to an inclined conveying position ahead of the truck. In the conveying position, the conveyor unit acts to convey bulk material upwardly and deposit the material into the dump body of the truck. In addition, a forward conveyor section is pivotally connected to the forward end of the main conveyor and can be pivoted forwardly to extend the length of the main conveyor. For transporting, the forward conveyor section is pivoted to the rear and nests within the main conveyor.

---

Feed mill trucks travel to farms in the area of the mill and pick up various types of farm products, such as grain, shelled corn, baled hay and the like, and haul the material to the mill. In the past, the bulk material was generally manually shoveled into the truck and this was a time consuming task which generally required the labor of two men. In some cases, portable conveying units were used for loading material into the truck. However, the portable conveying units generally had to be assembled and disassembled at the loading site and due to their lightweight construction were frequently damaged during handling or assembly.

Patent 3,263,844 of the same inventor is directed to a conveying mechanism which is permanently mounted on a truck and can be utilized to load a wide variety of materials into the body of the truck. With this type of conveying unit, an elongated carrier is mounted above the truck and is supported by a pivotal boom connected to the front bumper of the truck. By pivoting the boom, the conveyor can be moved from a horizontal transporting position above the truck to an inclined conveying position in which the forward end of the conveyor is located substantially at ground level and the rear end of the conveyor is located above the dump body of the truck.

The present invention is directed to an improvement to the vehicle-mounted conveyor disclosed in Patent 3,263,844. In accordance with one aspect of the invention, a forward conveyor section is pivotally connected to the forward end of the main conveyor. During transporting, the forward conveyor section is pivoted rearwardly so that it lies above the main conveyor and nests within the main conveyor. For conveying, the forward conveyor section is pivoted forwardly ahead of the main conveyor and serves to extend the overall length of the conveying unit without providing an increase in length of the conveyor unit for transporting.

The bulk material is conveyed rearwardly by the forward conveyor section and discharged onto the forward end of the main conveyor which then conveys the material upwardly and discharges the same into the dump body.

As an additional feature, the forward conveyor section can be pivoted laterally with respect to the main conveyor and can also be pivoted to a downwardly extending angle with respect to the main conveyor. This increases the flexibility of the conveyor unit enabling the forward conveyor section to move into locations which would normally be inaccessible to the main conveyor.

As a further improvement, the boom, which connects the forward portion of the truck chassis with the conveyor, is hollow and the hollow interior of the boom serves as a reservoir for hydraulic fluid used in operating the conveyor system.

The boom itself is generally rectangular in shape and the open center of the boom provides increased visibility in a forward direction for the driver of the truck.

As an additional feature, the boom is pivoted by a pair of hydraulic cylinder units which are connected between each side member of the boom and the main conveyor. The main conveyor is guided for fore and aft movement on the body of the truck, but is prevented from pivoting upward with respect to the truck body. Thus, extension and retraction of the hydraulic cylinder units which connect the boom and the conveyor will act to pivot the conveyor between the horizontal transporting position and the inclined conveying position. The connection of the cylinder units to the side members of the boom also increases the forward visibility of the driver in that the central opening in the rectangular boom is free of obstructions.

Moreover, the conveyor guide mechanism which prevents upward displacement of the conveyor prevents the conveyor from jumping the guide roller during transit over rough or uneven terrain.

Other objects and advantages will appear in the course of the following description.

The drawings illustrate the best mode presently contemplated of carrying out the invention.

In the drawings:

FIG. 3 is a fragmentary front view of the boom which supports the conveyor unit;

FIG. 4 is an enlarged fragmentary side elevation showing the connection of the hydraulic cylinder unit between the boom and the conveyor;

FIG. 5 is an enlarged fragmentary side elevation showing the guide structure for guiding the conveyor unit in movement on the truck body;

FIG. 6 is a transverse section taken along line 6—6 of FIG. 5;

FIG. 7 is a perspective view of the forward conveyor section;

FIG. 8 is a fragmentary side elevation showing the pivotal connection between the main conveyor and the forward conveyor section;

FIG. 9 is a view similar to FIG. 8 showing the forward section in the extended position;

FIG. 10 is a plan view of the forward conveyor section with parts broken away in section;

FIG. 11 is a fragmentary bottom view of the forward conveyor section;

FIG. 12 is a section taken along line 12—12 of FIG. 4;

Figure 1:
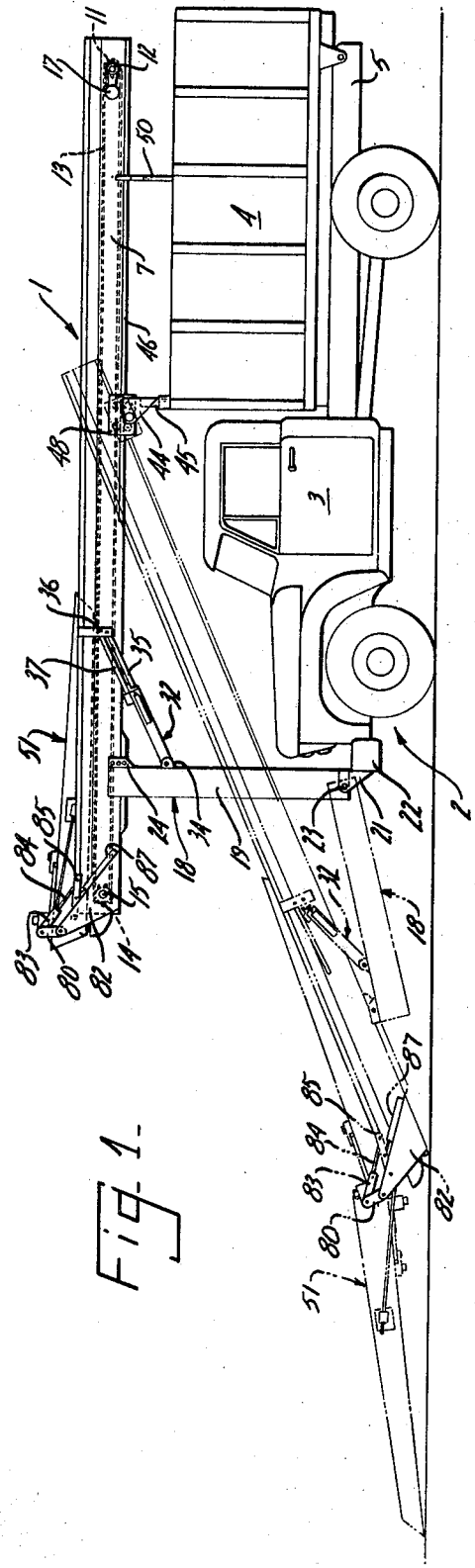
FIG. 1 is a side elevation of the conveyor unit of the invention as mounted on the dump body of a truck with the conveyor shown in the transporting position and the phantom line indicating the conveying position of the conveyor.

The drawings illustrate a conveyor unit 1 which is permanently mounted on a truck 2 and is adapted to convey and load material into the truck.

The truck 2 is a conventional dump-body type and includes a cab 3 and a dump body 4 which are mounted on a chassis 5. The body is adapted to be pivoted from a generally horizontal position to an inclined dumping position by a standard hydraulic unit indicated by 6.

The conveyor 1 is similar in structure and function to the conveyor disclosed in Patent 3,263,844 of the same inventor, and includes a pair of spaced side walls 7 connected by a bottom wall 8. The upper edges of side walls 7 are flared outwardly, as indicated at 9. In addition, a partition wall 10 is located in spaced relation above the bottom wall 8.

A drive sprocket 11 is secured to shaft 12 journalled within bearings in the side walls 7 at the rear end of the conveyor and an endless chain 13 is trained over sprocket 11 and also over idler sprocket 14 secured to a shaft 15 journalled within bearings in the side walls 7 at the forward end of the conveyor. The central wall 10 is located between the path of travel of the chain 13 and the chain carries a series of cleats or paddles 16 which move the material from the front to the rear end of the conveyor.

The conveyor chain 13 is driven by a hydraulic motor 17 mounted on the side wall 7 and acting through a sprocket drive in the manner disclosed in Patent 3,263,-844.

The conveyor 1 is adapted to be moved from a generally horizontal transporting position, as shown in FIG. 1, to an inclined conveying position, shown in the phantom lines in FIG. 1, by a boom 18. As best shown in FIG. 3, the boom 18 includes a pair of side members 19 which are connected together at their upper and lower ends by cross members 20. The lower ends of side members 19 are pivotally connected to brackets 21, which extend upwardly from bumper unit 22 of the truck, by pins 23. The upper ends of the side members 19 are provided with side plates 24 having a series of spaced holes 25 which provide an adjustment for the pivotal connection of the boom 18 to the conveyor 1. The boom 18 is pivotally connected to the conveyor 1 by a shaft 26 which extends through holes 25 and through aligned openings in bars 27 which extend downwardly from the lower wall 8 of the conveyor 1. The use of the series of holes 25 in plate 24 enables the conveyor unit to be readily installed with various makes of trucks which may vary from make-to-make in the relative height between the bumper and the dump body.

As shown in FIG. 3, the side members 19 and cross members 20 are hollow and provide a reservoir for hydraulic fluid. Openings 28 in the walls of the side members 19 provide communication between the interior of the side members 19 and the interior of the cross members 20, so that the entire interior of the boom 18 can be used as a reservoir for hydraulic fluid. The hydraulic fluid is introduced into the reservoir through a conduit 29 and is withdrawn through a second conduit 30.

To visually indicate the level of the hydraulic fluid within the reservoir, a generally L-shaped gauge 31 made of transparent material, such as plastic or glass, is connected between the upper cross member 20 and one of the side members 19. The gauge 31 enables the operator to readily see when the level of the hydraulic fluid within the reservoir drops below the cross member 20.

The conveyor 1 is moved from the transporting to the conveying position by a pair of hydraulic cylinder units 32, each of which includes a cylinder 33 having one end pivotally connected to lugs 34 attached to side member 19. A ram 35 is slidable within each of the cylinders 33 and the outer end of each ram is pivotally connected to a bracket 36 which is secured to the side wall 7 of the conveyor 1. By introducing hydraulic fluid into the forward or lower end of the cylinders 33, the rams 35 will be extended to thereby pivot the conveyor 1 to the horizontal transporting position as shown in FIG. 1. By introducing hydraulic fluid into the opposite end of the cylinders 33, the rams 35 will be retracted, causing the conveyor to move to the inclined conveying position, as shown by the phantom lines in FIG. 1.

The conveying unit of the invention includes a locking mechanism which prevents the conveyor 1 from pivoting from the transporting to the inclined position in the event a leak occurs in the hydraulic system. The locking mechanism includes a locking rod 37 having one end pivotally connected to the bracket 36 while the opposite or forward end of the rod 37 is adapted to engage a stop 38 mounted on the end of the cylinder 33. Stop 38, as best shown in FIGS. 4 and 12, is provided with a longitudinal groove 39, and in the locking position, the end of the rod 37 engages the stop at a position beneath the groove 39. To release the locking mechanism, the rod 37 is pivoted upwardly so that the forward end of the rod is moved in alignment with the groove 39 and the rod can then slide within the groove 39 as the ram 35 of cylinder unit 32 is retracted. The rod is pivoted upwardly by an angle bracket 40 which is hinged to the end of the cylinder 33. The angle bracket is pivoted about its hinged connection with the cylinder 33 by a ram 41 of cylinder 42 which is mounted on the outer surface of cylinder 33. By introducing hydraulic fluid into the forward or lower end of cylinder 42, the ram 41 will extend, thereby pivoting the angle bracket 40 and pivoting the locking rod 37 upwardly out of engagement with the stop 39. With the locking rod released, the ram 35 can then be retracted into the cylinder 33 to pivot the conveyor 1 forwardly. As the conveyor 1 pivots forwardly, the locking rod 37 will ride in the groove 39 in the stop block 38. When the conveyor 1 is moved to the horizontal transporting position, the rod 37 rides within groove 39 and falls behind stop 38 and the angle bracket 40 falls by gravity to its lower position.

As an added feature of the invention, an improved guide mechanism is provided for guiding the conveyor 1 in movement with respect to the dump body 4. As best shown in FIGS. 5 and 6, the bottom wall 8 of conveyor 1 is adapted to ride on a roller 43 which is journaled between a pair of plates 44 which extend upwardly from posts 45 mounted on the dump body 4. As shown in FIG. 6, flanges 46 extend laterally from the lower end of the side walls 7 of conveyor 1, and the flanges 46 are adapted to ride on a pair of lower rollers 47 which are journaled on plates 48. Each plate 48 is pivotally connected to the respective plate 44 through the shaft of roller 43. In addition to the lower rollers 47, a pair of upper rollers 49 are journaled on the plate 48 and ride on the upper surface of the flange 46. Engagement of the rollers 47 and 49 with the flange 46 prevents upward movement of the conveyor 1 with respect to the guide structure and thereby prevents the conveyor from being displaced from the roller 43 in the event the truck moves over rough or uneven terrain.

As an added advantage the conveyor guide mechanism cooperates with the cylinder units 32 in pivoting the conveyor unit between the horizontal transporting position and the inclined conveying position. Due to the engagement of the rollers 47 and 49 with the flange 46, the conveyor 1 cannot move upwardly from the guide roller 43 during pivotal movement of the conveyor, but nevertheless the conveyor can pivot with respect to the roller 43 due to the pivotal connection of the plate 48 to the plate 44. Thus, as the ram 35 is retracted into the cylinder 33, the boom 18 must necessarily pivot downwardly, for the conveyor 1 cannot move upwardly from the roller 43. When the ram is extended from the cylinder 33, the boom 18 will be pivoted upwardly due to the fact that the conveyor is restrained against upward movement by the engagement of the flange 46 with the rollers 47 and 49. Thus the guide mechanism for the conveyor cooperates with the hydraulic cylinder units 32 to provide a novel arrangement for pivoting the boom and conveyor between the transporting and conveying positions.

During transporting, the rear end of the conveyor is supported by a support member 50 which extends upwardly from the dump body 4.

In accordance with the invention, a forward conveyor section 51 is pivotally connected to the forward end of the conveyor 1 and is adapted to be pivoted from a storage position, in which the conveyor section 51 is disposed above and in nesting relation with the conveyor 1, to a conveying position in which the conveyor section 51 is located forwardly of the conveyor 1.

The forward conveyor section comprises a bottom 52, and a pair of side walls 53 extend upwardly from the bottom and are provided with outwardly flared edges 54. The conveyor section 51 has a lesser width than the conveyor 1 so that in the storage position the flared upper edges 54 will fit within the flared edges 9 of the side walls 7 of the conveyor 1.

A central wall 55 is located parallel to the bottom wall 52 and the bulk material to be conveyed is moved upwardly across the wall 55 and discharged into the forward end of the conveyor 1. To convey the bulk material within the conveyor section 51, a drive sprocket 56 is secured to a shaft 57 which extends between the side walls 53 of the conveyor section 51 and an idler sprocket 58 is secured to shaft 59 which is also journaled within the side walls 53. Connecting the sprockets 56 and 58 is an endless chain 60 carrying a series of cleats or conveying members 61, which are adapted to engage the bulk material and move the material upwardly over the wall 55 to the rear end of the conveyor section 51 where it is discharged into the forward end of the conveyor 1.

To drive the endless chain 60, a hydraulic motor 62 is mounted within the conveyor section 51 beneath the central wall 55. The drive shaft 63 of motor 62 carries a sprocket 64 which is connected to a sprocket 65 on shaft 57 by a chain 66. The sprockets 64 and 65, as well as the chain 66, are enclosed by a shield 67. With this construction, rotation of the drive shaft 63 acts to drive the sprocket 56 to drive the endless chain 60 and the cleats 61.

The forward conveyor section 51 is adapted to be pivotally connected to the conveyor 1 so that it can move laterally with respect to the conveyor 1. In this regard, the rear end of the conveyor section 51 is pivotally connected to a base unit 68 by a vertical shaft 69 which extends downwardly from the bottom wall 52 and is journaled within a boss 70 formed in the base unit 68, The base unit 68 also includes a horizontal shaft 71 and a plate 72 which extends forwardly from the shaft 71. The plate 72 is reinforced by a pair of reinforcing webs 73. The conveyor section 51 can be pivoted manually about the axis of shaft 69 with respect to the base unit 68, and to guide the conveyor section in movement a guide member 74 is connected to the bottom wall 52 and defines a recess which receives the forward edge of the plate 72.

To lock the conveyor section 51 in a given position with respect to the base unit 68, a rod 75 is pivotally connected to the horizontal shaft 71 and extends longitudinally along one of the side walls 53 of the conveyor section. The forward end of the rod 75 is slidably received within a block 76 which is pivotally connected to plate 77 mounted on the side wall 53. A locking pin 78 is adapted to be inserted through an opening in block 76 and through one of a series of holes in the rod 75 to thereby prevent the rod from moving relative to the conveyor section 51 and thereby lock the conveyor section with respect to the base unit 68.

As best shown in FIGS. 10 and 11, the rear end of the bottom wall 52 is provided with a series of slots 79. The slots 79 permit relatively fine material to fall through into the forward end of the conveyor 1, but prevents large material, such as corn cobs, from being thrown upwardly by the conveyor 1 into the conveyor section 51 where they might possibly jam the chain drive mechanism of the conveyor section 51.

To pivot the forward conveyor section 51 vertically with respect to the conveyor 1, a crank arm 80 is pivotally connected to each end of the horizontal shaft 71 of base unit 68, and the opposite end of each crank arm 80 is journaled about a stub shaft 81 which is mounted on the forward end of plate 82 extending outwardly from the side wall 7 of conveyor 1. Connected to each crank arm 80 is a link 83 and each link 83 is pivotally connected by a link 84 to an arm 85. The ram 86 of a hydraulic cylinder 87 is pivotally connected to each arm 85, and extension and retraction of the ram 86 acts through the links 85, 84 and 83 to pivot the crank arms 80 around the shafts 81. As shown in FIGS. 7–9, as the rams 86 are retracted into the cylinders 87, the conveyor section 51 is pivoted upwardly to the transporting position. Conversely, as the rams 86 are extended, the conveyor section 51 is pivoted outwardly to the conveying position. With the illustrated linkage arrangement, the axis of the stub shafts 81 serves as the center of rotation for the conveyor section 51 as it is moved between the transporting and conveying positions. The horizontal shaft 71 which is connected to the crank arms 80 moves in an arc about the axis of the shaft 81 and this motion enables the conveyor section 51 to be moved through an arc of more than 180° from a nested position within the conveyor 1 for transporting to a position where it is at a downwardly inclined location with respect to the main conveyor 1.

FIGS. 7 and 9 illustrate the conveyor section 51 in the conveying position in which the bulk material is moved upwardly by the cleats 61 and is discharged into the lower end of the conveyor 1. The forward end of bottom wall 52 of the conveyor 1 is generally curved and serves to receive the material from the conveyor section 51.

During transporting the conveyor 1 is mounted in a generally horizontal position, as shown in FIG. 1, with the conveyor section 51 in the nesting position above the conveyor 1.

When it is desired to load material into the dump body 4, the conveyor 1 is pivoted to the inclined conveying position by operation of the hydraulic cylinder units 32. As the conveyor 1 pivots downwardly to the conveying position, the lower surface of the conveyor rides on the roller 43, and the plate 48 which carries the guide rollers 47 and 49 pivots with respect to the plate 43, to accommodate the inclined movement of the conveyor 1.

When the conveyor 1 is at the desired inclined position, the cylinders 87 are actuated to pivot the conveyor section 51 forwardly to the phantom position shown in FIG. 1. Depending on the particular material to be conveyed, and the location of the same, the conveyor section 51 can be disposed in substantial longitudinal alignment with the conveyor 1 or it can either be at an upward or downward angle with respect to the conveyor 1.

To convey the material to the truck body, the motors 17 and 62 are operated, causing the material to be conveyed upwardly by conveyor section 51 and discharged into the lower end of conveyor 1. The conveyor 1, in turn, delivers the material into the dump body 4. During the conveying operation the operator can release the locking rod 75 and manually pivot the conveyor section 51 laterally to move the conveyor section 51 into engagement with the pile or mass of material to be conveyed.

After the material has been loaded, the conveyor section 51 is pivoted back to the nesting position through operation of the cylinders 87, and the cylinder units 32 are then operated to return the conveyor 1 to the horizontal transporting position.

Figure 2:
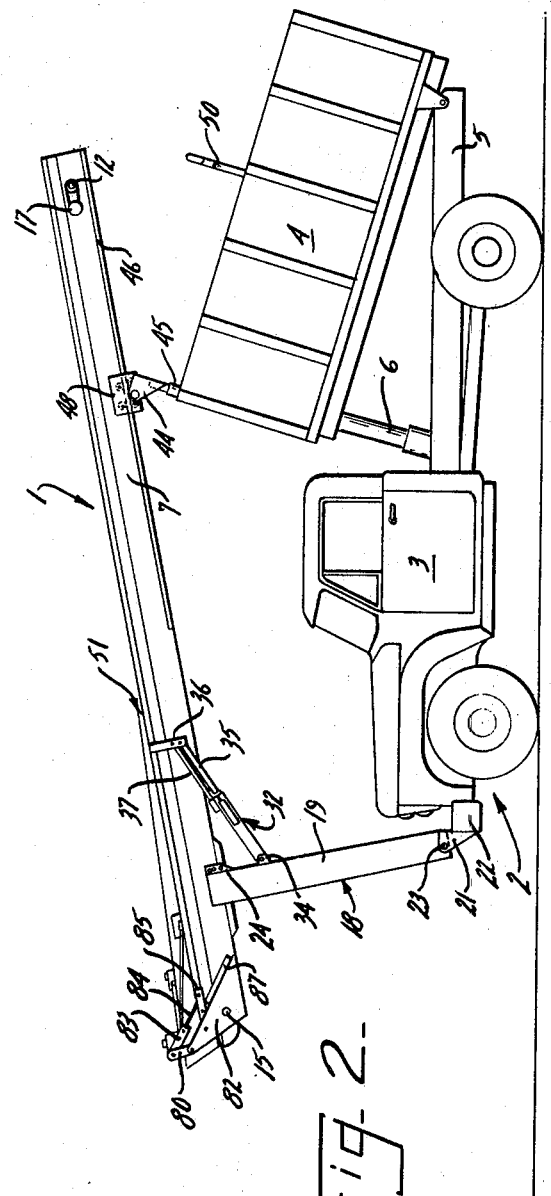
FIG. 2 is a side elevation similar to FIG. 1 showing the position of the conveyor when the dump body is pivoted to the dumping position.

When it is desired to dump the material from the body 4, the hydraulic unit 6 is actuated to tilt the dump body. As the dump body tilts, the conveyor 1 will ride on the roller 43 and the plate 48 which carries the guide rollers 47 and 49 will pivot with respect to the plate 44 secured to the dump body. As shown in FIG. 2, the boom 18 and the conveyor 1 retain their approximately 90° orientation as the conveyor is pivoted by tilting of the dump body. Thus, the material can be readily dumped from the body 4 without re-positioning or altering the conveying mechanism.

The forward conveyor section 51 increases the overall length of the conveying system without providing an increase in the length of the conveyor for transporting. As the conveyor section 51 can be manually pivoted laterally with respect to the main conveyor 1, the unit is more versatile, enabling a greater amount of material to be loaded without re-positioning the truck, and enabling the conveyor to more readily move into relatively inaccessible locations such as corners. In addition, the conveyor section 51 can be either positioned in longitudinal alignent with the axis of conveyor 1 or can be disposed at an upward or downwardly inclined angle with respect to the conveyor 1. This feature again increases the flexibility of the unit and enables the conveyor to move over or under objects to convey the material to the truck body 4.

The generally rectangular boom which connects the truck with the conveyor provides increased visibility for the truck driver during transporting. The boom not only serves to interconnect the conveyor and the truck, but also functions as a reservoir for hydraulic fluid, thereby eliminating the normal storage tank or reservoir which would be required in a conventional hydraulic system. As a further advantage, the reservoir defined by the interior of the boom 18 provides an automatically pressurized hydraulic system. For example, the reservoir is initially filled to about 90% of its volume, which includes the top cross member 20 of the boom, when the boom is in the upright position and with the piston rods or rams 35 extended. Subsequently, the rams 35 are retracted into the hydraulic cylinders 33 and the boom is lowered. The volume of fluid within the reservoir is increased due to the volume of fluid displaced to the reservoir from cylinders 33 as rams 35 are retracted, and the air within the reservoir is compressed by the additional volume of fluid. The compressed air in the reservoir creates a pressurized system which prevents cavitation of the pumps.

The conveying system of the invention also incorporates an automatic locking unit which locks the conveyor in the transporting position and prevents the conveyor from pivoting downwardly in the event a leak occurs in the hydraulic system. The locking mechanism is automatically released when the conveyor is to be moved to the conveying position.

Figure 13:
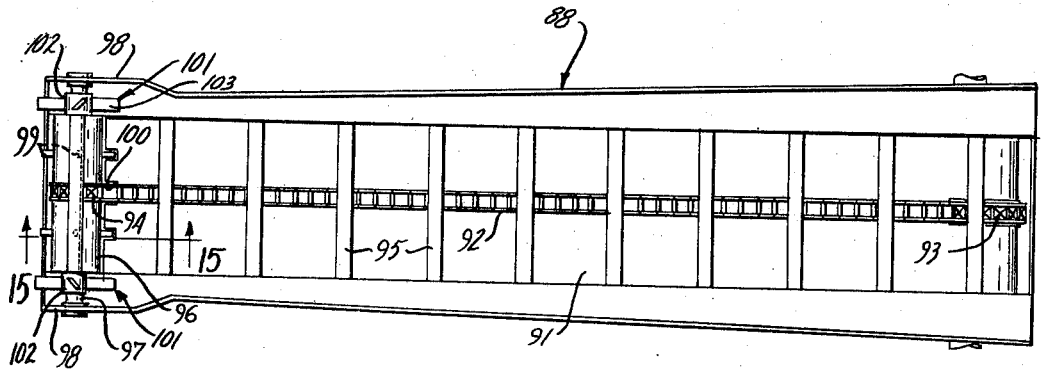
FIG. 13 is a plan view of a modified form of forward conveyor section.
Figure 14:
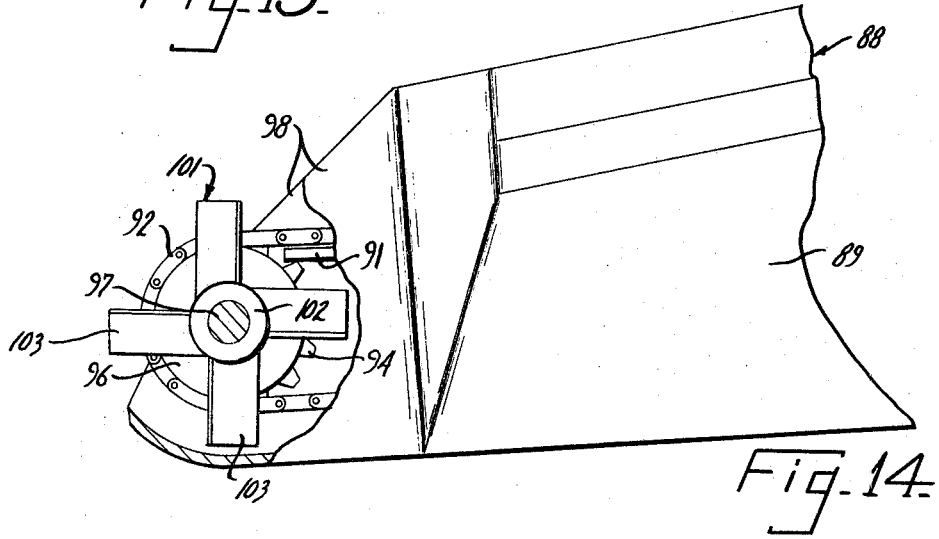
FIG. 14 is an enlarged fragmentary side elevation of the embodiment of FIG. 13, with parts broken away in section.
Figure 15:
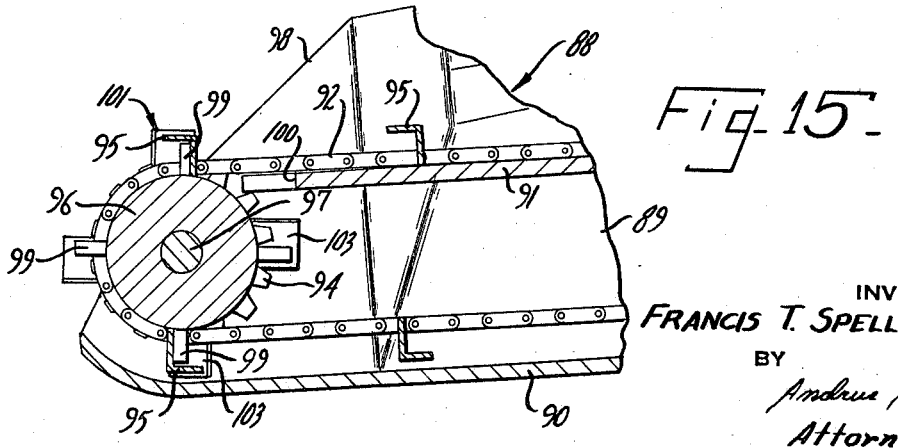
FIG. 15 is a section taken along line 15—15 of FIG. 13.

FIGS. 13–15 illustrate a modified form of the invention. In this embodiment, the forward conveyor section 88, which is attached to the conveyor 1 in the manner previously described, includes a pair of side walls 89 which are connected together along their bottom edges by a bottom wall 90. Spaced above the bottom wall 90 is a central wall 91 and a chain 92 is trained over a drive sprocket 93 located at the inner end of the conveyor section 88 and over an idler sprocket 94 located at the outer end of the conveyor section. The drive sprocket 93 is similar to sprocket 56 of the first embodiment and is driven in the same manner. As the drive sprocket 93 is rotated, the chain 92 moves in an endless path with the portion of the chain located above the central wall 91 moving rearwardly toward the main conveyor 1. The chain 92, as in the case of the first embodiment, carries a series of angle shaped cleats 95 which act to convey the dislodged material rearwardly toward the conveyor 1.

The sprocket 94 is formed integrally with a roller 96 and the roller shaft 97 is journalled within the flared forward ends 98 of the side walls 89. Extending radially outward from the surface of the roller 96 are a series of teeth or projections 99. As shown in the drawings, there are four longitudinal rows of two teeth each positioned on the peripheral surface of the roller 96. As the roller 96 rotates, the teeth 99 are adapted to penetrate into the material to be loaded and fluff up the material so that it can be more easily supplied to the conveying cleats 95.

The teeth 99 serve an additional and novel function in that they are intended to engage the cleats 95 as the chain 92 and roller 96 rotate and thereby maintain alignment of the cleats as the cleats pass around the roller 96. This function is best illustrated in FIG. 15. The teeth 99, which extend downwardly from the roller 96, are disposed in engagement with the vertical portion of an angle cleat 95 and thereby serve to maintain alignment of the cleat and prevent skewing as the cleat passes over the roller 96. The teeth 99 are arranged with respect to the cleats 95 so that each alternate row of teeth will engage one of the cleats 95. Thus, as shown in FIG. 15, the longitudinal row of teeth 99 extending horizontally from the roller 96 are not disposed in engagement with a cleat 95, but both rows of teeth 99 extending upwardly and downwardly from the roller 96 are engaged with a cleat.

The forward end of central wall 91 is disposed in close proximity to the peripheral surface of the roller 96 so that the material being loaded will not pass through the space therebetween. To accommodate the teeth 99, the forward edge of the central wall 91 is provided with a pair of slots 100 which receive the teeth as the teeth rotate with the roller 96.

In addition to the teeth 99, a pair of cutters 101 are located on the roller shaft 97 at either end of the roller 96. Each cutter 101 is provided with a central hub 102 which is secured to the roller shaft, and a series of cutter blades 103 extend radially outward from each hub. The blades 103 are formed of generally rectangular stock and are positioned at an angle of about 45 degrees with respect to the axis of the roller shaft 97. The cutters 101 aid in penetrating and dislodging the pile of material to be loaded and the angular disposition of the blades 103 serve to move the dislodged material toward the longitudinal centerline of the conveyor 88 where it can be more readily supplied to the conveyor.

The structure shown in FIGS. 13–15 aids in enabling the forward conveyor section to move under a pile of material to be loaded. Even if the material is well compacted, the rotating teeth 99 and cutters 101 serve to penetrate and dislodge the material so that it can be readily supplied to the forward conveyor section 88.

The conveying mechanism of the invention can be used for loading a wide variety of materials, such as farm products, building construction materials and the like, and can be used either with bulk type materials or larger articles.

I claim:

1. In combination, a vehicle, an elongated conveyor disposed above the vehicle and extending in a fore and aft direction with respect to the vehicle, a boom having one end pivotally connected to a forward portion of the vehicle and having the opposite end pivotally connected to the conveyor, means for moving the conveyor from a transporting position above the vehicle to an inclined conveying position in which the forward end of the conveyor is at a lower level ahead of the vehicle and the aft end of the conveyor is at a higher level above the vehicle, said conveyor including an endless member having a series of conveying elements disposed to convey material longitudinally of said conveyor as the endless member moves in endless travel, said conveying elements being disposed generally transverse to the direction of travel of the endless member, said conveyor also including a rotatable guide member disposed at the forward end of said conveyor for guiding the endless member in movement, and a series of projections disposed on said rotatable guide member and engageable with said conveying elements to maintain transverse alignment of said conveying elements with respect to said direction of travel.

2. The structure of claim 1, wherein said conveying elements comprise cleats and said projections are disposed to engage said cleats at locations disposed along the length of each cleat.

3. The structure of claim 1, and including a rotatable cutter located at the forward end of said conveyor and disposed laterally of said conveyor.

4. The structure of claim 3, wherein said cutter comprises a series of blades rotatable about a generally horizontal axis.

5. The structure of claim 4, wherein said cutter is driven by movement of said endless member and said blades are inclined at an acute angle to the direction of travel of said endless member to thereby aid in directing material to said conveying elements.

6. In combination, a vehicle having a body, an elongated conveyor disposed above the vehicle and extending in a fore and aft direction with respect to the vehicle, a boom pivotally interconnecting a forward portion of the vehicle and the conveyor, extensible means interconnecting the boom and the conveyor for moving the conveyor from a transporting position above the vehicle to an inclined conveying position in which the forward end of the conveyor is at a lower level ahead of the vehicle and aft end of the conveyor is at a higher level above the body, guide means on said vehicle for guiding the aft position of the conveyor in movement when the conveyor is moved between the transporting position and the conveying position, and means to prevent vertical displacement of said conveyor from said guide means during operation of said extensible means and thereby effect movement of said conveyor between said transporting and conveying positions.

7. The structure of claim 6, wherein said guide means includes a support member mounted on said vehicle and a roller rotatably mounted on said support member and disposed to be engaged by said conveyor.

8. The structure of claim 7, wherein said means to prevent upward displacement is movably engaged with said conveyor and pivotally connected to said support member.

9. The structure of claim 8, wherein said conveyor includes a laterally extending flange and said means to prevent upward displacement includes a rotatable member disposed to ride on the upper surface of said flange, and a bracket to carry said rotatable member, said bracket being pivotally mounted with respect to said truck.

10. The structure of claim 6, wherein said extensible means comprises a hydraulic system including a cylinder member and a piston member slidably disposed within said cylinder member, one of said members being connected to the boom and the other of said members being connected to the conveyor at a location to the rear of said boom.

11. The structure of claim 10, and including locking means separate from said hydraulic system for locking the piston member with respect to the cylinder member to prevent pivotal movement of the conveyor with respect to the vehicle.

12. The structure of claim 11, and including means for releasing said locking means.

13. In combination, a vehicle, an elongated first conveyor disposed above the vehicle and extending in a fore and aft direction with respect to the vehicle, a boom interconnecting a forward portion of the vehicle and the conveyor, means for pivoting said boom in a fore and aft direction to move the conveyor from a transporting position above the truck to an inclined conveying position in which the forward end of said conveyor is at a lower level ahead of the truck and the aft end of the conveyor is at a level above the vehicle, a second conveyor pivotally connected to the forward end of said first conveyor, pivotal means for pivoting said second conveyor from a transporting position wherein said second conveyor is located above and generally parallel to the first conveyor to a conveying position wherein said second conveyor extends forwardly from said first conveyor, said first conveyor being provided with an open top and said second conveyor when in the transporting position nesting within the open top of the first conveyor, the pivotal connection of said second conveyor to the first conveyor including a crank arm and said pivotal means being operably connected to said crank arm, said pivotal connection enabling the second conveyor to be pivoted through an arc greater than 180° with respect to the first conveyor, and means for pivoting the second conveyor laterally with respect to the first conveyor.

14. The structure of claim 13, and including locking means for locking the second conveyor in a given lateral position with respect to said first conveyor.

15. In combination, a vehicle having a body, an elongated working member disposed above the vehicle and extending in a fore and aft direction with respect to the vehicle, a boom pivotally interconnecting a forward portion of the vehicle and the working member, hydraulic means for pivoting the boom with respect to the vehicle to move the working member from a transporting position above the vehicle to an inclined working position in which the forward end of the working member is at a lower level ahead of the vehicle and the aft end of the working member is at a higher level, said boom including a pair of generally parallel side members and at least one cross member interconnecting said side members, the interior of said cross member communicating with the interior of the side members and the interior of the side members and the cross member defining a reservoir for hydraulic fluid to actuate said hydraulic means, and conduit means for interconnecting said reservoir and said hydraulic means.

16. The structure of claim 15 and including fluid indicating means interconnecting one of said side members and said cross member for providing a visual indication of the level of fluid in said reservoir.

References Cited

UNITED STATES PATENTS

| | | | |
|---|---|---|---|
| 733,824 | 7/1903 | Dueringer | 198—87 |
| 2,056,501 | 10/1936 | Berger et al. | |
| 2,201,334 | 5/1940 | Cartlidge | 198—88 X |
| 2,347,308 | 4/1944 | Woldring et al. | |
| 2,577,328 | 12/1951 | Hyman | 198—87 |
| 2,760,622 | 8/1956 | Magee | 198—87 X |
| 2,776,763 | 1/1957 | Meyer et al. | 214—83.26 |
| 3,032,213 | 5/1962 | Bopp. | |
| 3,263,844 | 8/1966 | Spellman | 214—508 |

ALBERT J. MAKAY, Primary Examiner

U.S. Cl. X.R.

198—94, 95, 120.5, 126; 214—522